(12) United States Patent
Anchi et al.

(10) Patent No.: US 12,299,327 B2
(45) Date of Patent: May 13, 2025

(54) CONCURRENT HANDLING OF MULTIPLE ASYNCHRONOUS EVENTS IN A STORAGE SYSTEM

(71) Applicant: Dell Products L.P., Round Rock, TX (US)

(72) Inventors: Amit Pundalik Anchi, Bangalore (IN); Rimpesh Patel, Bangalore (IN); Ramprasad Shetty, Southborough, MA (US); Arieh Don, Newton, MA (US)

(73) Assignee: Dell Products L.P., Round Rock, TX (US)

(*) Notice: Subject to any disclaimer, the term of this patent is extended or adjusted under 35 U.S.C. 154(b) by 777 days.

(21) Appl. No.: 17/573,782

(22) Filed: Jan. 12, 2022

(65) Prior Publication Data

US 2023/0221890 A1 Jul. 13, 2023

(51) Int. Cl.
*G06F 12/00* (2006.01)
*G06F 3/06* (2006.01)

(52) U.S. Cl.
CPC .......... *G06F 3/0659* (2013.01); *G06F 3/0613* (2013.01); *G06F 3/0653* (2013.01); *G06F 3/0683* (2013.01)

(58) Field of Classification Search
CPC .... G06F 3/0613; G06F 3/0653; G06F 3/0659; G06F 3/0683
(Continued)

(56) References Cited

U.S. PATENT DOCUMENTS 6,567,397 B1 5/2003 Campana et al.
6,687,746 B1 2/2004 Shuster et al.
(Continued)

FOREIGN PATENT DOCUMENTS

| CN | 103677927 B | 2/2017 |
|---|---|---|
| EP | 1117028 A2 | 7/2001 |

(Continued)

OTHER PUBLICATIONS

Kris Piepho, "Dell EMC SC Series Storage: Microsoft Multipath I/O," Dell EMC Best Practices, Jan. 2017, 57 pages.
(Continued)

*Primary Examiner* — Mohamed M Gebril
(74) *Attorney, Agent, or Firm* — Ryan, Mason & Lewis, LLP

(57) ABSTRACT

An apparatus in one embodiment comprises at least one processing device configured to detect a plurality of asynchronous events in a storage system, wherein the storage system is configured to provide respective individual asynchronous event notifications for the detected asynchronous events to a host device in response to receipt of corresponding asynchronous event requests from the host device. The at least one processing device is further configured to determine that multiple ones of the asynchronous events have been detected in the storage system without receipt of respective ones of the corresponding asynchronous event requests from the host device, and to provide to the host device in response to a particular one of the asynchronous event requests received from the host device a summary notification comprising information indicative of the multiple detected asynchronous events. The at least one processing device illustratively comprises at least one storage controller of the storage system.

20 Claims, 4 Drawing Sheets

(58) Field of Classification Search
USPC .................................................... 711/154
See application file for complete search history.

(56) References Cited

U.S. PATENT DOCUMENTS

| | | |
|---|---|---|
| 6,697,875 B1 | 2/2004 | Wilson |
| 7,275,103 B1 | 9/2007 | Thrasher et al. |
| 7,454,437 B1 | 11/2008 | Lavallee et al. |
| 7,617,292 B2 | 11/2009 | Moore et al. |
| 7,668,981 B1 | 2/2010 | Nagineni et al. |
| 7,770,053 B1 | 8/2010 | Bappe et al. |
| 7,809,912 B1 | 10/2010 | Raizen et al. |
| 7,818,428 B1 | 10/2010 | Lavallee et al. |
| 7,890,664 B1 | 2/2011 | Tao et al. |
| 7,904,681 B1 | 3/2011 | Bappe et al. |
| 7,925,872 B2 | 4/2011 | Lai et al. |
| 8,108,582 B2 * | 1/2012 | Ambikapathy ......... G06F 13/24 |
| | | 710/267 |
| 8,250,256 B2 | 8/2012 | Ghosalkar et al. |
| 8,285,825 B1 | 10/2012 | Nagaraj et al. |
| 8,825,919 B1 | 9/2014 | Lim et al. |
| 8,832,334 B2 | 9/2014 | Okita |
| 8,874,746 B1 | 10/2014 | Gonzalez |
| 9,026,694 B1 | 5/2015 | Davidson et al. |
| 9,201,803 B1 | 12/2015 | Derbeko et al. |
| 9,400,611 B1 | 7/2016 | Raizen |
| 9,430,368 B1 | 8/2016 | Derbeko et al. |
| 9,594,780 B1 | 3/2017 | Esposito et al. |
| 9,647,933 B1 | 5/2017 | Tawri et al. |
| 9,672,160 B1 | 6/2017 | Derbeko et al. |
| 9,778,852 B1 | 10/2017 | Marshak et al. |
| 10,289,325 B1 | 5/2019 | Bono |
| 10,353,714 B1 | 7/2019 | Gokam et al. |
| 10,439,878 B1 | 10/2019 | Tah et al. |
| 10,474,367 B1 | 11/2019 | Mallick et al. |
| 10,476,960 B1 | 11/2019 | Rao et al. |
| 10,521,369 B1 | 12/2019 | Mallick et al. |
| 10,606,496 B1 | 3/2020 | Mallick et al. |
| 10,637,917 B2 | 4/2020 | Mallick et al. |
| 10,652,206 B1 | 5/2020 | Pusalkar et al. |
| 10,754,572 B2 | 8/2020 | Kumar et al. |
| 10,757,189 B2 | 8/2020 | Mallick et al. |
| 10,764,371 B2 | 9/2020 | Rao et al. |
| 10,789,006 B1 | 9/2020 | Gokam et al. |
| 10,817,181 B2 | 10/2020 | Mallick et al. |
| 10,838,648 B2 | 11/2020 | Sharma et al. |
| 10,880,217 B2 | 12/2020 | Mallick et al. |
| 10,884,935 B1 | 1/2021 | Doddaiah |
| 10,911,402 B2 | 2/2021 | Pusalkar et al. |
| 2002/0023151 A1 | 2/2002 | Iwatani |
| 2002/0103923 A1 | 8/2002 | Cherian et al. |
| 2004/0010563 A1 | 1/2004 | Forte et al. |
| 2006/0026346 A1 | 2/2006 | Kadoiri et al. |
| 2006/0195850 A1 * | 8/2006 | Knight .................... G06F 9/542 |
| | | 719/318 |
| 2006/0277383 A1 | 12/2006 | Hayden et al. |
| 2007/0073633 A1 * | 3/2007 | Gallant .................. H04L 41/06 |
| 2007/0174849 A1 | 7/2007 | Cheung et al. |
| 2008/0043973 A1 | 2/2008 | Lai et al. |
| 2008/0201458 A1 | 8/2008 | Salli |
| 2008/0301332 A1 | 12/2008 | Butler et al. |
| 2008/0307435 A1 * | 12/2008 | Rehman .................. G06F 9/542 |
| | | 719/318 |
| 2009/0259749 A1 | 10/2009 | Barrett et al. |
| 2010/0054762 A1 * | 3/2010 | Kim ....................... G03G 15/55 |
| | | 358/1.9 |
| 2010/0313063 A1 | 12/2010 | Venkataraja et al. |
| 2011/0197027 A1 | 8/2011 | Balasubramanian et al. |
| 2011/0296230 A1 | 12/2011 | Chen et al. |
| 2012/0102369 A1 | 4/2012 | Hiltunen et al. |
| 2012/0246345 A1 | 9/2012 | Contreras et al. |
| 2013/0117766 A1 | 5/2013 | Bax et al. |
| 2013/0339551 A1 | 12/2013 | Flanagan et al. |
| 2014/0105068 A1 | 4/2014 | Xu |
| 2015/0222705 A1 | 8/2015 | Stephens |
| 2015/0242134 A1 | 8/2015 | Takada et al. |
| 2016/0092136 A1 | 3/2016 | Balakrishnan et al. |
| 2016/0117113 A1 | 4/2016 | Li et al. |
| 2016/0335003 A1 | 11/2016 | Ahmed et al. |
| 2017/0132169 A1 * | 5/2017 | Nelogal ............... G06F 13/4068 |
| 2017/0235507 A1 | 8/2017 | Sinha et al. |
| 2017/0286205 A1 * | 10/2017 | Jeong .................. G06F 11/3072 |
| 2018/0189635 A1 | 7/2018 | Olarig et al. |
| 2018/0253256 A1 | 9/2018 | Bharadwaj |
| 2018/0317101 A1 | 11/2018 | Koue |
| 2019/0095299 A1 | 3/2019 | Liu et al. |
| 2019/0108888 A1 | 4/2019 | Sarkar et al. |
| 2019/0250845 A1 * | 8/2019 | Kabra ................. G06F 13/1673 |
| 2019/0334987 A1 | 10/2019 | Mallick et al. |
| 2020/0021653 A1 | 1/2020 | Rao et al. |
| 2020/0089609 A1 * | 3/2020 | Colline ............... G06F 13/1668 |
| 2020/0097203 A1 | 3/2020 | Mallick et al. |
| 2020/0106698 A1 | 4/2020 | Rao et al. |
| 2020/0110552 A1 | 4/2020 | Kumar et al. |
| 2020/0112608 A1 | 4/2020 | Patel et al. |
| 2020/0192588 A1 | 6/2020 | Kumar et al. |
| 2020/0204475 A1 | 6/2020 | Mallick et al. |
| 2020/0204495 A1 | 6/2020 | Mallick et al. |
| 2020/0213274 A1 | 7/2020 | Pusalkar et al. |
| 2020/0241890 A1 | 7/2020 | Mallick et al. |
| 2020/0310690 A1 * | 10/2020 | Annavaram .......... G06F 3/0659 |
| 2020/0314218 A1 | 10/2020 | Kumar et al. |
| 2020/0348860 A1 | 11/2020 | Mallick et al. |
| 2020/0348861 A1 | 11/2020 | Marappan et al. |
| 2020/0348869 A1 | 11/2020 | Gokam |
| 2020/0349094 A1 | 11/2020 | Smith et al. |
| 2020/0363985 A1 | 11/2020 | Gokam et al. |
| 2020/0372401 A1 | 11/2020 | Mallick et al. |
| 2021/0019054 A1 | 1/2021 | Anchi et al. |
| 2021/0026551 A1 | 1/2021 | Tidke et al. |
| 2021/0026650 A1 | 1/2021 | Rao et al. |
| 2021/0157502 A1 | 5/2021 | Rao et al. |
| 2021/0181965 A1 | 6/2021 | Anchi et al. |
| 2022/0300174 A1 * | 9/2022 | Bert ..................... G06F 3/0653 |
| 2023/0221890 A1 * | 7/2023 | Anchi ................... G06F 3/0683 |
| | | 711/154 |

FOREIGN PATENT DOCUMENTS

| | | |
|---|---|---|
| EP | 2667569 A1 | 11/2013 |
| WO | PCT/US2019/052549 | 12/2019 |
| WO | PCT/US2019/053204 | 12/2019 |
| WO | PCT/US2019/053473 | 12/2019 |
| WO | PCT/US2019/067144 | 5/2020 |

OTHER PUBLICATIONS

NVM Express, "NVM Express, Revision 1.3," NVM Express, May 1, 2017, 282 pages.

Vmware, "Multipathing Configuration for Software iSCSI Using Port Binding," Technical White Paper, Apr. 25, 2012, 15 pages.

Dell EMC, "Dell EMC SC Series Storage: Microsoft Multipath I/O," Dell EMC Engineering, Jun. 2017, 56 pages.

Dell EMC, "Dell EMC PowerPath Family: PowerPath and PowerPath/VE Multipathing," Data Sheet, 2017, 3 pages.

EMC, "EMC PowerPath and PowerPath/VE Family for Windows," Installation and Administration Guide, Oct. 2018, 102 pages.

EMC, "EMC Powerpath Load Balancing and Failover", Comparison with native MPIO operating system solutions, Feb. 2011, 28 pages.

Dell EMC, "PowerMax OS," Dell EMC PowerMax Family Product Guide, May 2019, 192 pages.

Dell EMC, "Dell EMC SC Series Storage and Microsoft Multipath I/O," CML 1004, Jul. 2018, 36 pages.

Vmware, Inc. "VMware VMFS Volume Management," 2009, 8 pages.

Dell EMC, "Dell EMC Unity: Virtualization Integration," Technical White Paper, Oct. 2019, 39 pages.

Dell EMC, "Dell EMC PowerMax: iSCSI Implementation for Dell EMC Storage Arrays Running PowerMaxOS," Technical White Paper, Sep. 2019, 35 pages.

(56) References Cited

OTHER PUBLICATIONS

NVM Express, "NVM Express Base Specification, Revision 2.0a," NVM Express, Jul. 23, 2021, 454 pages.

* cited by examiner

FIG. 4

| Event Summary Data Structure for Host Device i | |
|---|---|
| EVENT 1 | EVENT TYPE, LOG PAGE ID AND OTHER INFORMATION |
| EVENT 2 | EVENT TYPE, LOG PAGE ID AND OTHER INFORMATION |
| ... | ... |
| EVENT P | EVENT TYPE, LOG PAGE ID AND OTHER INFORMATION |

400

CONCURRENT HANDLING OF MULTIPLE ASYNCHRONOUS EVENTS IN A STORAGE SYSTEM

FIELD

The field relates generally to information processing systems, and more particularly to storage in information processing systems.

BACKGROUND

Storage arrays and other types of storage systems are often shared by multiple host devices over a network. Applications running on the host devices each include one or more processes that perform the application functionality. The processes issue input-output (IO) operations directed to particular logical storage volumes or other logical storage devices, for delivery by the host devices over selected paths to storage ports of the storage system. Different ones of the host devices can run different applications with varying workloads and associated IO patterns. Such host devices also generate additional IO operations in performing various data services such as migration and replication. Various types of storage access protocols can be used by the host devices to access the logical storage volumes or other logical storage devices of the storage system, including by way of example Small Computer System Interface (SCSI) access protocols and Non-Volatile Memory Express (NVMe) access protocols. In such storage systems, problems can arise in situations in which there are multiple events to be concurrently processed by the storage system for notification to one or more host devices.

SUMMARY

Illustrative embodiments disclosed herein provide techniques for concurrent handling of multiple asynchronous events in a storage system that communicates with one or more host devices over a storage area network (SAN) or other type of network utilizing an NVMe access protocol or other type of storage access protocol.

Although some embodiments are described herein as addressing and overcoming particular event processing problems arising in the context of an NVMe access protocol, it is to be appreciated that the disclosed techniques can be adapted in a straightforward manner for use with other types of storage access protocols.

In an illustrative embodiment, an apparatus comprises at least one processing device that includes a processor and a memory, with the processor being coupled to the memory. The at least one processing device is configured to detect a plurality of asynchronous events in a storage system, wherein the storage system is configured to provide respective individual asynchronous event notifications for the detected asynchronous events to a host device in response to receipt of corresponding asynchronous event requests from the host device.

The at least one processing device is further configured to determine that multiple ones of the asynchronous events have been detected in the storage system without receipt of respective ones of the corresponding asynchronous event requests from the host device, and to provide to the host device in response to a particular one of the asynchronous event requests received from the host device a summary notification comprising information indicative of the multiple detected asynchronous events. The at least one processing device illustratively comprises at least one storage controller of the storage system, such as, for example, one or more NVMe storage controllers, although other types and arrangements of one or more storage controllers, or other types and arrangements of one or more processing devices of a storage system, can be used in other embodiments.

In some embodiments, the asynchronous event requests and the corresponding asynchronous event notifications are configured in accordance with a designated storage access protocol, such as an NVMe access protocol.

For example, the plurality of asynchronous events may comprise asynchronous events of different types, including two or more of an error status event, a health status event, a notice event and a vendor specific event, and wherein at least one of the event types comprises a plurality of sub-types.

In some embodiments, the storage system after reporting a first individual asynchronous event notification for a first one of the detected asynchronous events of a given event type is further configured to delay reporting another individual asynchronous event notification for another one of the detected asynchronous events of the given event type until at least such time as the host device clears the reported first individual asynchronous event notification by reading a corresponding log page from the storage system.

The summary notification comprising information indicative of the multiple detected asynchronous events in some embodiments more particularly comprises at least a summary log page identifier that is utilized by the host device to read a corresponding summary log page from the storage system. The summary notification illustratively denotes a summary event comprising the multiple detected asynchronous events.

The summary log page illustratively contains information characterizing detected asynchronous events that are at least one of (i) not yet reported by the storage system to the host device and (ii) reported by the storage system to the host device but not yet cleared by the host device.

In some embodiments, the summary log page comprises information characterizing multiple detected asynchronous events having a same event type but respective different sub-types within that event type.

Additionally or alternatively, the summary log page in some embodiments comprises information characterizing multiple detected asynchronous events of respective different event types.

The at least one processing device in some embodiments is further configured to receive from the host device a request for the summary log page and to provide the summary log page to the host device in response to the request.

The particular one of the asynchronous event requests received from the host device and triggering provision of the summary notification illustratively comprises a next one of the asynchronous event requests received after the determination that multiple ones of the asynchronous events have been detected in the storage system without receipt of respective ones of the corresponding asynchronous event requests from the host device.

In some embodiments, the at least one processing device is further configured to maintain at least one data structure characterizing at least unreported ones of the detected asynchronous events, and to generate the summary notification based at least in part on the unreported ones of the detected asynchronous events characterized by the at least one data structure. The one or more data structures can additionally or alternatively characterize detected events that have been reported to the host device but not yet cleared by the host device.

These and other illustrative embodiments include, without limitation, apparatus, systems, methods and computer program products comprising processor-readable storage media.

BRIEF DESCRIPTION OF THE DRAWINGS

FIG. 4 shows an example data structure utilized in concurrent handling of multiple asynchronous events in a storage system for notification to one or more host devices in an illustrative embodiment.

DETAILED DESCRIPTION

Illustrative embodiments will be described herein with reference to exemplary information processing systems and associated computers, servers, storage devices and other processing devices. It is to be appreciated, however, that embodiments of the present disclosure are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center that includes one or more clouds hosting multiple tenants that share cloud resources, or an enterprise-based information processing system, or combinations thereof. Numerous other types of enterprise and cloud-based computing and storage systems are also encompassed by the term "information processing system" as that term is broadly used herein.

Figure 1:
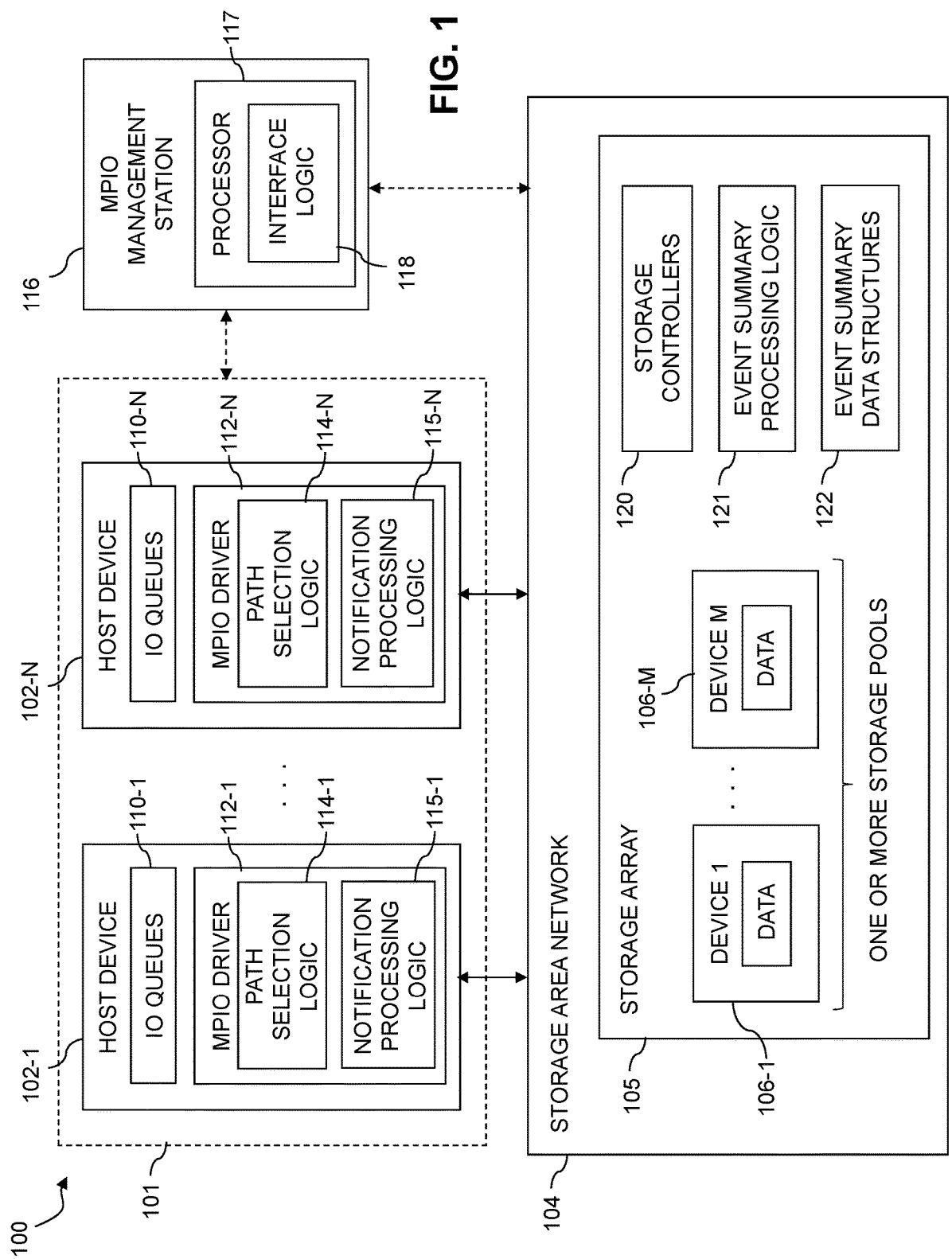
FIG. 1 is a block diagram of an information processing system configured with functionality for concurrent handling of multiple asynchronous events in a storage system for notification to one or more host devices in an illustrative embodiment.

FIG. 1 shows an information processing system 100 configured in accordance with an illustrative embodiment. The information processing system 100 comprises a computer system 101 illustratively comprising a plurality of host devices 102-1, . . . 102-N. The host devices 102 communicate over a storage area network (SAN) 104 with at least one storage array 105. The storage array 105 comprises a plurality of storage devices 106-1, . . . 106-M each storing data utilized by one or more applications running on one or more of the host devices 102. The storage devices 106 are illustratively arranged in one or more storage pools.

The storage array 105 and its associated storage devices 106 are an example of what is more generally referred to herein as a "storage system." This storage system in the present embodiment is shared by the host devices 102, and is therefore also referred to herein as a "shared storage system." Other embodiments can include only a single host device, possibly configured to have exclusive use of the storage system.

In some embodiments, the storage array 105 more particularly comprises a distributed storage array that includes multiple storage nodes interconnected with one another, possibly in a mesh network arrangement. Such an arrangement is an example of what is more generally referred to herein as a "distributed storage system."

As will be described in more detail below, illustrative embodiments provide functionality for concurrent handling of multiple asynchronous events in the storage array 105 for notification to one or more of the host devices 102.

The host devices 102 illustratively comprise respective computers, servers or other types of processing devices capable of communicating with the storage array 105 over the SAN 104. For example, at least a subset of the host devices 102 may be implemented as respective virtual machines of a compute services platform or other type of processing platform. The host devices 102 in such an arrangement illustratively provide compute services such as execution of one or more applications on behalf of each of one or more users associated with respective ones of the host devices 102.

The term "user" herein is intended to be broadly construed so as to encompass numerous arrangements of human, hardware, software or firmware entities, as well as combinations of such entities.

Compute and/or storage services may be provided for users under a Platform-as-a-Service (PaaS) model, an Infrastructure-as-a-Service (IaaS) model, a Function-as-a-Service (FaaS) model and/or a Storage-as-a-Service (STaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The storage devices 106 of the storage array 105 of SAN 104 implement logical units (LUNs) configured to store objects for users associated with the host devices 102. These objects can comprise files, blocks or other types of objects. The host devices 102 interact with the storage array 105 utilizing read and write commands as well as other types of commands that are transmitted over the SAN 104. Such commands in some embodiments more particularly comprise Small Computer System Interface (SCSI) commands of a SCSI access protocol and/or Non-Volatile Memory Express (NVMe) commands of an NVMe access protocol, although other types of commands can be used in other embodiments. A given IO operation as that term is broadly used herein illustratively comprises one or more such commands. References herein to terms such as "input-output" and "IO" should be understood to refer to input and/or output. Thus, an IO operation relates to at least one of input and output.

Also, the term "storage device" as used herein is intended to be broadly construed, so as to encompass, for example, a logical storage device such as a LUN or other logical storage volume. A logical storage device can be defined in the storage array 105 to include different portions of one or more physical storage devices. Storage devices 106 may therefore be viewed as comprising respective LUNs or other logical storage volumes.

Each of the host devices 102 illustratively has multiple paths to the storage array 105, with at least one of the storage devices 106 of the storage array 105 being visible to that host device on a given one of the paths. A given one of the storage devices 106 may be accessible to the given host device over multiple paths.

Different ones of the storage devices 106 of the storage array 105 illustratively exhibit different latencies in processing of IO operations. In some cases, the same storage device may exhibit different latencies for different ones of multiple paths over which that storage device can be accessed from a given one of the host devices 102.

The host devices 102, SAN 104 and storage array 105 in the FIG. 1 embodiment are assumed to be implemented using at least one processing platform each comprising one or more processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The host devices 102 and the storage array 105 may be implemented on respective distinct processing platforms, although numerous other arrangements are possible. For example, in some embodiments at least portions of the host devices 102 and the storage array 105 are implemented on the same processing platform. The storage array 105 can therefore be implemented at least in part within at least one processing platform that implements at least a subset of the host devices 102.

The SAN 104 may be implemented using multiple networks of different types to interconnect storage system components. For example, the SAN 104 may comprise a portion of a global computer network such as the Internet, although other types of networks can be part of the SAN 104, including a wide area network (WAN), a local area network (LAN), a satellite network, a telephone or cable network, a cellular network, a wireless network such as a WiFi or WiMAX network, or various portions or combinations of these and other types of networks. The SAN 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand (IB), Gigabit Ethernet or Fibre Channel (FC). Numerous alternative networking arrangements are possible in a given embodiment, as will be appreciated by those skilled in the art.

The host devices 102 comprise respective sets of IO queues 110-1, . . . 110-N and respective MPIO drivers 112-1, . . . 112-N. The MPIO drivers 112 collectively comprise a multi-path layer of the host devices 102. Path selection functionality for delivery of IO operations from the host devices 102 to the storage array 105 is provided in the multi-path layer by respective instances of path selection logic 114-1, . . . 114-N implemented within the MPIO drivers 112. The multi-path layer further includes functionality for processing asynchronous event summaries and related notifications received from the storage array 105. Such functionality is provided at least in part using respective instances of notification processing logic 115-1, . . . 115-N implemented within the MPIO drivers 112. Such notification processing logic 115 can be implemented elsewhere in the host devices 102 in other embodiments. Although not explicitly shown, additional logic instances can be incorporated into the MPIO drivers 112 or elsewhere in the host devices 102 for performing additional functionality relating to concurrent handling of multiple asynchronous events in the system 100, such as logic instances for generation and delivery of asynchronous event requests or other related commands from the host devices 102 to the storage array 105.

The term "asynchronous event" as used herein is intended to be broadly construed, so as to encompass, for example, a wide variety of different types of occurrences that can arise in a storage system and are to be notified to one or more host devices under one or more particular conditions, such as upon receipt of a corresponding request from the host device, rather than in a synchronous manner.

The term "asynchronous event summary" as used herein is also intended to be broadly construed, so as to encompass, for example, an asynchronous event notification indicative of a summary event and/or a summary log page that is obtained by a given one of the host devices 102 under the control of its corresponding instance of notification processing logic 115 responsive to receipt of an asynchronous event notification indicative of a summary event from the storage array 105. A given such asynchronous event notification indicative of a summary event is an example of what is more generally referred to herein as a "summary notification."

The MPIO drivers 112 may comprise, for example, otherwise conventional MPIO drivers, such as PowerPath® drivers from Dell Technologies, suitably modified in the manner disclosed herein to provide functionality for processing asynchronous event summaries obtained from the storage array 105. Other types of MPIO drivers from other driver vendors may be suitably modified to incorporate functionality for processing asynchronous event summaries obtained from the storage array 105 as disclosed herein.

The host devices 102 can include additional or alternative components. For example, in some embodiments, the host devices 102 comprise respective local caches, implemented using respective memories of those host devices. A given such local cache can be implemented using one or more cache cards, possibly implementing caching techniques such as those disclosed in U.S. Pat. Nos. 9,201,803, 9,430,368 and 9,672,160, each entitled "System and Method for Caching Data," and incorporated by reference herein. A wide variety of different caching techniques can be used in other embodiments, as will be appreciated by those skilled in the art. Other examples of memories of the respective host devices 102 that may be utilized to provide local caches include one or more memory cards or other memory devices, such as, for example, an NVMe over PCIe cache card, a local flash drive or other type of NVM storage drive, or combinations of these and other host memory devices.

The system 100 further comprises an MPIO management station 116 that includes a processor 117 implementing interface logic 118. The interface logic 118 is utilized to communicate with the host devices 102 and the storage array 105. Such an MPIO management station 116 provides management functionality for the multi-path layer comprising the MPIO drivers 112 of the host devices 102. In some embodiments, host device management software executing on the MPIO management station 116 interacts with storage array management software executing on the storage array 105. The MPIO management station 116, or portions thereof, may be considered in some embodiments as forming part of what is referred to herein as a "multi-path layer"

that includes the MPIO drivers 112 of the host devices 102. The term "multi-path layer" as used herein is intended to be broadly construed and may comprise, for example, an MPIO layer or other multi-path software layer of a software stack, or more generally multi-pathing software program code, running on one or more processing devices each comprising at least one processor and at least one memory.

The MPIO management station 116 is an example of what is more generally referred to herein as an "external server" relative to the storage array 105. Additional or alternative external servers of different types can be used in other embodiments. In some embodiments, one or more external servers, such as the MPIO management station 116, perform at least a portion of the functionality for concurrent handling of multiple asynchronous events involving one or more of the host devices 102 and the storage array 105 as disclosed herein, illustratively by serving as an intermediary device between the instances of notification processing logic 115 of the respective MPIO drivers 112 and the storage array 105. Other embodiments can eliminate the MPIO management station 116.

Also, although notification processing logic 115 is shown as part of the MPIO drivers 112 in this embodiment, other embodiments can implement such logic elsewhere in the host devices 102. For example, in some embodiments, the host devices 102 can be implemented without multi-pathing functionality and therefore without a multi-path layer.

The MPIO driver 112-1 is configured to deliver IO operations selected from its corresponding set of IO queues 110-1 to the storage array 105 via selected ones of multiple paths over the SAN 104. The sources of the IO operations stored in the set of IO queues 110-1 illustratively include respective processes of one or more applications executing on the host device 102-1. For example, IO operations can be generated by each of multiple processes of a database application running on the host device 102-1. Such processes issue IO operations for delivery to the storage array 105 over the SAN 104. Other types of sources of IO operations may be present in a given implementation of system 100.

A given IO operation is therefore illustratively generated by a process of an application running on the host device 102-1, and is queued in a given one of the IO queues 110-1 of the host device 102-1 with other operations generated by other processes of that application, and possibly other processes of other applications.

The paths from the host device 102-1 to the storage array 105 illustratively comprise paths associated with respective initiator-target pairs, with each initiator comprising a host bus adaptor (HBA) or other initiating entity of the host device 102-1 and each target comprising a port or other targeted entity corresponding to one or more of the storage devices 106 of the storage array 105. As noted above, the storage devices 106 illustratively comprise LUNs or other types of logical storage devices.

In some embodiments, the paths are associated with respective communication links between the host device 102-1 and the storage array 105 with each such communication link having a negotiated link speed. For example, in conjunction with registration of a given HBA to a switch of the SAN 104, the HBA and the switch may negotiate a link speed. The actual link speed that can be achieved in practice in some cases is less than the negotiated link speed, which is a theoretical maximum value. A negotiated link speed is an example of what is more generally referred to herein as a "negotiated rate."

The negotiated rates of the respective initiator and target of a particular one of the paths illustratively comprise respective negotiated data rates determined by execution of at least one link negotiation protocol for that path. The link negotiation protocol is illustratively performed separately by the initiator and the target, and involves each such component separately interacting with at least one switch of a switch fabric of the network 104 in order to determine the negotiated rate, potentially leading to substantial mismatches in initiator and target negotiated rates for the same switch, set of switches or switch fabric of the SAN 104.

The term "negotiated rate" therefore illustratively comprises a rate negotiated between an initiator or a target and a switch of a switch fabric of network 104. However, the term "negotiated rate" as used herein is intended to be broadly construed so as to also encompass, for example, arrangements that refer to negotiated speeds. Any of a wide variety of different link negotiation protocols can be used, including auto-negotiation protocols, as will be readily appreciated by those skilled in the art.

For example, some embodiments are configured to utilize link negotiation protocols that allow negotiation of data rates, such as 1G, 2G, 4G, 8G, 16G, 32G, 64G and 128G, where G denotes Gigabits per second (Gb/sec). The link bandwidth is illustratively specified in terms of Megabytes per second (MB/sec), and the actual amount of data that can be sent over the link in practice is typically somewhat lower than the negotiated data rate. Accordingly, a negotiated rate of 1G in some systems may correspond to an actual achievable data rate that is lower than 100 MB/sec, such as a rate of 85 MB/sec. Other negotiated rates referred to herein are denoted in terms of Gigabytes per second (GB/sec).

The term "negotiated rate" as used herein is therefore intended to be broadly construed, so as to encompass, for example, a theoretical negotiated rate or an actual achievable data rate that corresponds to the theoretical negotiated rate within a given system.

It is also to be appreciated that a wide variety of other types of rate negotiation may be performed in other embodiments.

Various host-side scheduling algorithms, load balancing algorithms and/or other types of algorithms can be utilized by the MPIO driver 112-1 in delivering IO operations from the IO queues 110-1 to the storage array 105 over particular paths via the SAN 104. Each such IO operation is assumed to comprise one or more commands for instructing the storage array 105 to perform particular types of storage-related functions such as reading data from or writing data to particular logical volumes of the storage array 105. Such commands are assumed to have various payload sizes associated therewith, and the payload associated with a given command is referred to herein as its "command payload."

A command directed by the host device 102-1 to the storage array 105 is considered an "outstanding" command until such time as its execution is completed in the viewpoint of the host device 102-1, at which time it is considered a "completed" command. The commands illustratively comprise respective SCSI commands, although other command formats can be used in other embodiments. A given such command is illustratively defined by a corresponding command descriptor block (CDB) or similar format construct. The given command can have multiple blocks of payload associated therewith, such as a particular number of 512-byte SCSI blocks or other types of blocks.

In illustrative embodiments to be described below, it is assumed without limitation that the initiators of a plurality of initiator-target pairs comprise respective HBAs of the host device 102-1 and that the targets of the plurality of initiator-target pairs comprise respective ports of the storage array 105. Examples of such HBAs and storage array ports are illustrated in conjunction with the embodiment of FIG. 3.

Selecting a particular one of multiple available paths for delivery of a selected one of the IO operations of the set of IO queues 110-1 is more generally referred to herein as "path selection." Path selection as that term is broadly used herein can in some cases involve both selection of a particular IO operation and selection of one of multiple possible paths for accessing a corresponding logical device of the storage array 105. The corresponding logical device illustratively comprises a LUN or other logical storage volume to which the particular IO operation is directed.

It should be noted that paths may be added or deleted between the host devices 102 and the storage array 105 in the system 100. For example, the addition of one or more new paths from host device 102-1 to the storage array 105 or the deletion of one or more existing paths from the host device 102-1 to the storage array 105 may result from respective addition or deletion of at least a portion of the storage devices 106 of the storage array 105.

Addition or deletion of paths can also occur as a result of zoning and masking changes or other types of storage system reconfigurations performed by a storage administrator or other user. Some embodiments are configured to send a predetermined command from the host device 102-1 to the storage array 105, illustratively utilizing the MPIO driver 112-1, to determine if zoning and masking information has been changed. The predetermined command can comprise, for example, a log sense command, a mode sense command, a vendor unique (VU) command, or combinations of multiple instances of these or other commands, in an otherwise standardized storage access protocol command format.

In some embodiments, paths are added or deleted in conjunction with addition of a new storage array or deletion of an existing storage array from a storage system that includes multiple storage arrays, possibly in conjunction with configuration of the storage system for at least one of a migration operation and a replication operation.

For example, a storage system may include first and second storage arrays, with data being migrated from the first storage array to the second storage array prior to removing the first storage array from the storage system.

As another example, a storage system may include a production storage array and a recovery storage array, with data being replicated from the production storage array to the recovery storage array so as to be available for data recovery in the event of a failure involving the production storage array.

In these and other situations, path discovery scans may be repeated as needed in order to discover the addition of new paths or the deletion of existing paths.

A given path discovery scan can be performed utilizing known functionality of conventional MPIO drivers, such as PowerPath® drivers.

The path discovery scan in some embodiments may be further configured to identify one or more new LUNs or other logical storage volumes associated with the one or more new paths identified in the path discovery scan. The path discovery scan may comprise, for example, one or more bus scans which are configured to discover the appearance of any new LUNs that have been added to the storage array 105 as well to discover the disappearance of any existing LUNs that have been deleted from the storage array 105.

The MPIO driver 112-1 in some embodiments comprises a user-space portion and a kernel-space portion. The kernel-space portion of the MPIO driver 112-1 may be configured to detect one or more path changes of the type mentioned above, and to instruct the user-space portion of the MPIO driver 112-1 to run a path discovery scan responsive to the detected path changes. Other divisions of functionality between the user-space portion and the kernel-space portion of the MPIO driver 112-1 are possible. The user-space portion of the MPIO driver 112-1 is illustratively associated with an Operating System (OS) kernel of the host device 102-1. Other MPIO driver arrangements are possible. For example, in some embodiments, an MPIO driver may be configured using a kernel-based implementation, and in such an arrangement may include only a kernel-space portion and no user-space portion.

For each of one or more new paths identified in the path discovery scan, the host device 102-1 may be configured to execute a host registration operation for that path. The host registration operation for a given new path illustratively provides notification to the storage array 105 that the host device 102-1 has discovered the new path.

The MPIO management station 116 is arranged as an intermediary device relative to the host devices 102 and the storage array 105. Some communications between the host devices 102 and the storage array 105 can occur via such an intermediary device, which as indicated elsewhere herein can alternatively comprise one or more external servers. Such communications illustratively involve utilization of an out-of-band communication mechanism, such as one or more IP connections between the host devices 102 and the MPIO management station 116.

As indicated previously, the host devices 102 communicate directly with the storage array 105 using one or more storage access protocols such as SCSI, Internet SCSI (iSCSI), SCSI over FC (SCSI-FC), NVMe over FC (NVMe/FC), NVMe over Fabrics (NVMeF), NVMe over TCP (NVMe/TCP), and/or others. The MPIO management station 116 in some embodiments is similarly configured to communicate directly with the storage array 105 using one or more such storage access protocols.

The MPIO driver 112-1 on the host device 102-1 illustratively has connectivity to the MPIO management station 116. The MPIO management station 116 in some embodiments implements PowerPath® Management Appliance (PPMA) functionality to obtain access to the host devices 102 and the storage array 105. The MPIO driver 112-1 can obtain from the MPIO management station 116 certain types of storage array related information for use in various operations performed at least in part by the MPIO driver 112-1, in addition to or in place of obtaining such information directly from the storage array 105. Host multi-pathing software can be used to implement a multi-path layer comprising MPIO drivers 112 of respective host devices 102 as well as related management appliance software such as the above-noted PPMA of MPIO management station 116. Such host multi-pathing software can be configured to facilitate processing of asynchronous event summaries obtained from the storage array 105 as disclosed herein. For example, multi-pathing software residing on one or more of the host devices 102 (e.g., a server such as an ESXi server or an AIX server) is utilized in illustrative embodiments to facilitate processing of asynchronous event summaries obtained from the storage array 105.

As noted above, the initiators of the initiator-target pairs illustratively comprise respective HBAs of the host device 102-1 and the targets of the initiator-target pairs comprise respective storage array ports of the storage array 105.

Negotiated rates of the respective particular initiator and the corresponding target illustratively comprise respective negotiated data rates determined by execution of at least one link negotiation protocol for an associated one of the paths.

In some embodiments, at least a portion of the initiators comprise virtual initiators, such as, for example, respective ones of a plurality of N-Port ID Virtualization (NPIV) initiators associated with one or more Fibre Channel (FC) network connections. Such initiators illustratively utilize NVMe arrangements such as NVMe/FC, although other protocols can be used. Other embodiments can utilize other types of virtual initiators in which multiple network addresses can be supported by a single network interface, such as, for example, multiple media access control (MAC) addresses on a single network interface of an Ethernet network interface card (NIC).

Accordingly, in some embodiments, the multiple virtual initiators are identified by respective ones of a plurality of media MAC addresses of a single network interface of a NIC. Such initiators illustratively utilize NVMe arrangements such as NVMe/TCP, although again other protocols can be used.

In some embodiments, the NPIV feature of FC allows a single host HBA port to expose multiple World Wide Numbers (WWNs) to the SAN 104 and the storage array 105. A WWN or World Wide Identifier (WWID) is a unique identifier used in various types of storage technologies that may be implemented in illustrative embodiments herein, including, for example, SCSI, NVMe, FC, Parallel Advanced Technology Attachment (PATA), Serial Advanced Technology Attachment (SATA), Serial Attached SCSI (SAS) and others, and may be viewed as an example of what is more generally referred to herein as a virtual identifier. The NPIV feature is used, for example, when there are multiple IO producers on a given host device with a need to distinguish which IO is related to which producer.

One such case is a system involving virtual machines (VMs), where multiple VMs run on a single ESXi server with HBAs. All VMs are using all HBAs but there is a need to be able to distinguish which IO belongs to which VM, for example, in order to implement service level objectives (SLOs) between the various VMs, illustratively at an OS level. Each of the NPIV initiators behaves as if it is a "normal" or physical initiator, in that it logs into a storage array port, requires masking, etc. Another example of NPIV usage is in the context of AIX servers, where different logical partitions each use a different NPIV initiator over the same host HBA port.

Accordingly, in some embodiments, multiple virtual initiators are associated with a single HBA of the host device 102-1 but have respective unique identifiers associated therewith.

Additionally or alternatively, different ones of the multiple virtual initiators are illustratively associated with respective different ones of a plurality of virtual machines of the host device that share a single HBA of the host device, or a plurality of logical partitions of the host device that share a single HBA of the host device.

Again, numerous alternative virtual initiator arrangements are possible, as will be apparent to those skilled in the art. The term "virtual initiator" as used herein is therefore intended to be broadly construed. It is also to be appreciated that other embodiments need not utilize any virtual initiators. References herein to the term "initiators" are intended to be broadly construed, and should therefore be understood to encompass physical initiators, virtual initiators, or combinations of both physical and virtual initiators.

As indicated previously, problems can arise in situations in which there are multiple events to be concurrently processed by a storage system such as the storage array 105 for notification to one or more host devices such as host devices 102.

Illustrative embodiments disclosed herein provide techniques for concurrent handling of multiple asynchronous events in the storage array 105. It is assumed in some of these embodiments that the storage array 105 communicates with the host devices 102 over the SAN 104 utilizing an NVMe access protocol.

In the FIG. 1 embodiment, the storage array 105 comprises a plurality of storage controllers 120, event summary processing logic 121, and one or more event summary data structures 122 for storing event types, log page identifiers and other related information for each of a plurality of different asynchronous events. In other embodiments, at least portions of one or more of the event summary processing logic 121 and the event summary data structures 122 can be implemented at least in part external to the storage array 105 rather than internal to the storage array 105. For example, in some embodiments at least portions of the event summary processing logic 121 and event summary data structures 122 are implemented on one or more servers that are external to the storage array 105.

Accordingly, such logic components and related stored information may be located internal to the storage array 105, external to the storage array 105, or implemented in part internally and in part externally to the storage array 105, and can include various combinations of hardware, firmware and software. The term "logic" as used herein is therefore intended to be broadly construed.

As indicated above, at least portions of the communications between the host devices 102 and the storage array 105 can utilize an in-band communication mechanism in which one or more predetermined commands in a designated storage access protocol are sent from the host device 102-1 to the storage array 105. Such predetermined commands can comprise, for example, read and/or write commands, sense commands (e.g., log sense and/or mode sense commands), VU commands, or combinations of multiple instances of these or other commands, in an otherwise standardized command format, such as a SCSI format, an NVMe format, or other type of format. A "command" as the term is broadly used herein can comprise a combination of multiple distinct commands.

It is also possible for the host devices 102 and the storage array 105 to communicate via one or more out-of-band communication mechanisms. For example, an out-of-band communication mechanism of this type can involve host management software of the host device 102-1 communicating with storage array management software of the storage array 105 over an IP network connection or other type of network connection. Such host management software can include software running on the MPIO management station 116, in addition to or in place of software running on the individual host devices 102.

Additional components not explicitly shown in the figure, such as one or more storage caches, may also be provided in the storage array 105 for use in processing IO operations. For example, in some embodiments, each of the storage controllers 120 has a different local cache or a different allocated portion of a global cache associated therewith, although numerous alternative arrangements are possible. The storage controllers 120 can be implemented as respective storage processors, directors or other storage system components configured to control storage system operations relating to processing of IO operations.

As indicated above, illustrative embodiments overcome various drawbacks of conventional practice by configuring the system 100 to include functionality for processing asynchronous event summaries utilizing the host devices 102 and the storage array 105, as will now be described in more detail.

In accordance with example concurrent event processing functionality of system 100, at least one processing device of the storage array 105 is configured to detect a plurality of asynchronous events in the storage array 105, where the storage array 105 is configured to provide respective individual asynchronous event notifications for the detected asynchronous events to host device 102-1 in response to receipt of corresponding asynchronous event requests from the host device 102-1.

The at least one processing device is further configured to determine that multiple ones of the asynchronous events have been detected in the storage array 105 without receipt of respective ones of the corresponding asynchronous event requests from the host device 102-1, and to provide to the host device 102-1 in response to a particular one of the asynchronous event requests received from the host device 102-1 a summary notification comprising information indicative of the multiple detected asynchronous events.

The at least one processing device illustratively comprises at least a portion of at least one of the storage controllers 120 of the storage array 105, such as, for example, one or more NVMe storage controllers, although other types and arrangements of the one or more storage controllers 120, or other types and arrangements of one or more processing devices of the storage array 105, can be used in other embodiments.

In some embodiments, the asynchronous event requests and the corresponding asynchronous event notifications are configured in accordance with a designated storage access protocol, such as an NVMe access protocol.

For example, the plurality of asynchronous events may comprise asynchronous events of different types, including two or more of an error status event, a health status event, a notice event and a vendor specific event, and wherein at least one of the event types comprises a plurality of sub-types.

In some embodiments, the storage array 105 after reporting a first individual asynchronous event notification for a first one of the detected asynchronous events of a given event type is further configured to delay reporting another individual asynchronous event notification for another one of the detected asynchronous events of the given event type until at least such time as the host device 102-1 clears the reported first individual asynchronous event notification by reading a corresponding log page from the storage array 105.

The summary notification comprising information indicative of the multiple detected asynchronous events in some embodiments more particularly comprises at least a summary log page identifier that is utilized by the host device 102-1 to read a corresponding summary log page from the storage array 105. The summary notification illustratively denotes a summary event comprising the multiple detected asynchronous events.

The summary log page illustratively contains information characterizing detected asynchronous events that are at least one of (i) not yet reported by the storage array 105 to the host device 102-1 and (ii) reported by the storage array 105 to the host device 102-1 but not yet cleared by the host device 102-1.

In some embodiments, the summary log page comprises information characterizing multiple detected asynchronous events having a same event type but respective different sub-types within that event type.

Additionally or alternatively, the summary log page in some embodiments comprises information characterizing multiple detected asynchronous events of respective different event types.

The at least one processing device in some embodiments is further configured to receive from the host device 102-1 a request for the summary log page and to provide the summary log page to the host device 102-1 in response to the request.

The particular one of the asynchronous event requests received from the host device 102-1 and triggering provision of the summary notification illustratively comprises a next one of the asynchronous event requests received after the determination that multiple ones of the asynchronous events have been detected in the storage array 105 without receipt of respective ones of the corresponding asynchronous event requests from the host device 102-1.

In some embodiments, the at least one processing device is further configured to maintain at least one data structure of the event summary data structures 122 characterizing at least unreported ones of the detected asynchronous events, and to generate the summary notification based at least in part on the unreported ones of the detected asynchronous events characterized by the at least one data structure. The one or more data structures can additionally or alternatively characterize detected events that have been reported to the host device but not yet cleared by the host device. An example of a data structure of this type is described in more detail below in conjunction with FIG. 4.

These and other aspects of concurrent handling of multiple asynchronous events in system 100 are illustratively performed at least in part by storage controllers 120 utilizing event summary processing logic 121 and event summary data structures 122, and interacting with notification processing logic 115 of the MPIO drivers 112 of the host device 102. Additional or alternative system components can be used in other embodiments. For example, MPIO drivers are not required, and other types of host drivers or more generally other host device components can be used.

As described above, in illustrative embodiments disclosed herein, the host devices 102 are configured to interact with storage array 105 to obtain asynchronous event summaries each characterizing multiple events of potentially different types.

An example of an algorithm performed in the system 100 will be described below, in the context of asynchronous event requests and asynchronous request notifications using an NVMe access protocol. Such asynchronous event requests and asynchronous request notifications are also referred to herein as AERs and AENs, respectively. The algorithm is performed by one or more of the storage controllers 120 of the storage array 105 interacting with host software of the host devices 102. Such host software illustratively includes the instances of notification processing logic 115 implemented on respective host devices 102, as well as additional host device logic instances for generating AERs.

In embodiments utilizing an NVMe access protocol, one or more of the storage controllers 120 of storage array 105 are illustratively configured to provide notification of asynchronous events, such as error events, health status events, notice events and vendor specific events, among others, to one or more of the host devices 102. To enable asynchronous events to be reported by the storage controller, host software submits one or more AERs to the storage controller, also referred to herein as simply a "controller." The controller illustratively notifies an event to the host by "completing" an AER command via a corresponding AEN, in some embodiments by posting what is referred to as a "completion queue entry" for that AER command. The total number of simultaneously outstanding AER commands is limited by the AER limit of the NVMe standard, which is typically set to a maximum value of 16 as specified in an Identify Controller data structure. The controller completes one of the outstanding AER commands to notify an NVMe event to the host software and the corresponding notification is referred to as an asynchronous event notification or AEN.

NVMe events are grouped into event types, such as, for example, error, health status, notice and vendor specific. When the controller posts a completion queue entry for an outstanding AER command and thus reports an event, subsequent events of that event type are automatically masked by the controller until the host clears the reported event. An event is cleared by the host reading the log page associated with that event, illustratively using a Get Log Page command. Each AER is completed with a single AEN at a time. If an event occurs and there are no AER commands currently outstanding, the controller retains the event information for that event type and uses that information as a response to completion of the next AER command sent by the host.

There are multiple challenges faced by a storage system and host software due to the current architecture or model of reporting NVMe events as defined in the NVMe standard, where these and other details of the NVMe standard can be found in the specification document cited elsewhere herein.

For example, storage system challenges include:
1. Serialization of AENs due to limitations on outstanding AERs—In scenarios in which the controller has a surge of multiple events of different types, reporting of these events to host software is serialized and limited by the number of outstanding AERs and in order to report each such event the storage system and its controller may have to wait to receive a new AER from the host software. So AEN delivery/consumption depends on how quickly the host software issues a request by submitting the next AER. Until the next AER is sent to the storage system by the host software, the controller is required to retain the event information for that type.
2. Masking notification of NVMe events for sub-types that are categorized under the same event type (e.g., "Notice") if there is already an outstanding AEN for this type—AENs are broadly categorized on the following event types/sub-types as listed below:
(a) Error event
(b) SMART/Health Status event
(c) Notice event, which has sub-types as follows:
  Namespace Attribute Changed;
  Firmware Activation Starting;
  Telemetry Log Changed;
  Asymmetric Namespace Access Change;
  Predictable Latency Event Aggregate Log Change;
  LBA Status Information Alert; and
  Endurance Group Event Aggregate Log Page Change.
(d) Vendor specific event The notice event type can be particularly problematic in that the NVMe standard only has provision to generate AENs at the granularity of event type and not its sub-type, so if there are multiple sub-type events generated then only one gets notified as the later events are masked until the existing AEN of this notice event type is cleared.

Example host device challenges include the following:
1. Non-efficient delivery and handling of NVMe events—Storage system challenges as described above have implications for host software, as such host software may not be able to optimally receive and handle multiple events generated by the storage system. There may be situations in which the host software is busy servicing the current received NVMe event which may be low priority to the host software and the subsequent high importance NVMe event may be delayed due to resource limitations.

Illustrative embodiments herein overcome these and other challenges, at least in part by effectively creating a new event type—referred to herein as a summary event type. This summary event type is associated with a summary log page identifier which consolidates information characterizing multiple events into a summary log page that is made available to the host software. This advantageously allows host software to receive a summary of multiple events that were detected in the storage system, even if the otherwise required AERs have not been sent for each of the multiple events. The summary event type can be implemented, for example, as a vendor specific event under the existing NVMe standard or through actual revision of the NVMe standard to create a new event type.

In some embodiments, concurrent handling of multiple asynchronous events is performed in accordance with the following example algorithm, carried out by the storage array 105 and a given one of the host devices 102, although it is to be appreciated that additional or alternative steps can be used, and their ordering varied relative to that shown below:

1. The storage array 105 maintains a table of information characterizing multiple detected events. The table includes event types and corresponding log page identifiers for each of a plurality of detected events, and possibly additional information such as sub-type for event types that have sub-types. Accordingly, this information is maintained at a granularity sufficient to distinguish each event type and its corresponding sub-types if any. The event information for a given detected event is cleared from the table when a corresponding Get Log Page command including the log page identifier for the event is received from the host device and processed by the controller. The table is an example of what is more generally referred to as a "data structure" and may be viewed as an example of at least a portion of one of the event summary data structures 122.

2. The storage array 105 implements a summary log page, which can be requested by a given one of the host devices 102 responsive to a summary notification provided to the given host device. The summary log page illustratively comprises the current set of unreported events and reported but uncleared events, from the above-noted table, possibly arranged in a particular predefined numerical order.

3. At times when the storage array 105 is facing challenges of the type described previously, for example, in being unable to report multiple AENs due to no outstanding AERs from the given host device, summary event information is constructed in the table in the manner as described previously.

4. The storage system 105 reports a summary AEN on receiving the next AER from the given host device.

5. The host software of the given host device on receiving the summary AEN will send a Get Log Page command utilizing the log page identifier of the summary log page. The summary log page illustratively includes information for all those events that were detected but failed to report earlier, and possibly also previously reported but uncleared events. The host software is thereby provided with access to the summary event information and will be able to process detected events of interest in order of priority.

These and other illustrative embodiments provide a highly efficient solution that overcomes the event processing challenges described previously.

It is to be appreciated that the particular ordering and configuration of the algorithm steps described in conjunction with the illustrative embodiments herein is exemplary only. Additional or alternative steps, possibly with a different ordering and/or partial overlap between certain steps, can be used.

Illustrative embodiments disclosed herein can provide concurrent handling of multiple asynchronous events for a wide variety of different types of host devices, such as host devices comprising ESXi servers or AIX servers.

Additional examples of arrangements for concurrently handling multiple events will be described elsewhere herein in conjunction with the embodiments of FIGS. 2 through 4. Other types of arrangements for concurrently handling multiple events can be used in other embodiments.

Although in some embodiments certain commands used by the host devices 102 to communicate with the storage array 105 illustratively comprise NVMe commands, other types of commands and command formats can be used in other embodiments. Additional details regarding NVMe access protocols used in illustrative embodiments can be found, for example, in the NVMe Specification, Revision 2.0a, July 2021, which is incorporated by reference herein. Other NVMe storage access protocols of this type that may be utilized in illustrative embodiments disclosed herein include NVMe/FC, NVMeF and NVMe/TCP.

The storage array 105 in the present embodiment is assumed to comprise a persistent memory that is implemented using a flash memory or other type of non-volatile memory of the storage array 105. More particular examples include NAND-based flash memory or other types of non-volatile memory such as resistive RAM, phase change memory, spin torque transfer magneto-resistive RAM (STT-MRAM) and Intel Optane™ devices based on 3D XPoint™ memory. The persistent memory is further assumed to be separate from the storage devices 106 of the storage array 105, although in other embodiments the persistent memory may be implemented as a designated portion or portions of one or more of the storage devices 106. For example, in some embodiments the storage devices 106 may comprise flash-based storage devices, as in embodiments involving all-flash storage arrays, or may be implemented in whole or in part using other types of non-volatile memory.

The storage array 105 in the present embodiment may comprise additional components not explicitly shown in the figure, such as a response time control module and IO operation priority queues, illustratively configured to make use of the above-described persistent memory. For example, the response time control module may be used to implement storage array based adjustments in response time for particular IO operations based at least in part on service level objective (SLO) information stored by the storage array 105 in its persistent memory. The response time control module is assumed to operate in conjunction with the above-noted IO operation priority queues.

The storage array 105 illustratively utilizes its IO operation priority queues to provide different levels of performance for IO operations. For example, the IO operation priority queues may have respective different priority levels. The storage array 105 may be configured to provide different priority levels for different ones of the IO operations by assigning different ones of the IO operations to different ones of the IO operation priority queues. The IO operation priority queues are illustratively associated with respective SLOs for processing of IO operations in the storage array 105. Process tags may be used in assigning different ones of the IO operations to different ones of the IO operation priority queues, as disclosed in U.S. Pat. No. 10,474,367, entitled "Storage System with Input-Output Performance Control Utilizing Application Process Detection," which is incorporated by reference herein.

As mentioned above, communications between the host devices 102 and the storage array 105 may utilize PCIe connections or other types of connections implemented over one or more networks, using interfaces and protocols as previously described. Numerous other interfaces and associated protocols can be used in other embodiments.

The storage array 105 in some embodiments may be implemented as part of cloud infrastructure in the form of a cloud-based system. Such a cloud-based system can additionally or alternatively be used to implement other portions of system 100, such as the host devices 102 and the MPIO management station 116.

The storage devices 106 of the storage array 105 can be implemented using solid state drives (SSDs). Such SSDs are implemented using non-volatile memory (NVM) devices such as flash memory. Other types of NVM devices that can be used to implement at least a portion of the storage devices 106 include non-volatile random access memory (NVRAM), phase-change RAM (PC-RAM) and magnetic RAM (MRAM). These and various combinations of multiple different types of NVM devices or other storage devices may also be used. For example, hard disk drives (HDDs) can be used in combination with or in place of SSDs or other types of NVM devices. Accordingly, numerous other types of electronic or magnetic media can be used in implementing at least a subset of the storage devices 106.

The storage array 105 may additionally or alternatively be configured to implement multiple distinct storage tiers of a multi-tier storage system. By way of example, a given multi-tier storage system may comprise a fast tier or performance tier implemented using flash storage devices or other types of SSDs, and a capacity tier implemented using HDDs, possibly with one or more such tiers being server based. A wide variety of other types of storage devices and multi-tier storage systems can be used in other embodiments, as will be apparent to those skilled in the art. The particular storage devices used in a given storage tier may be varied depending on the particular needs of a given embodiment, and multiple distinct storage device types may be used within a single storage tier. As indicated previously, the term "storage device" as used herein is intended to be broadly construed, and so may encompass, for example, SSDs, HDDs, flash drives, hybrid drives or other types of storage products and devices, or portions thereof, and illustratively include logical storage devices such as LUNs.

As another example, the storage array 105 may be used to implement one or more storage nodes in a cluster storage system comprising a plurality of storage nodes interconnected by one or more networks.

It should therefore be apparent that the term "storage array" as used herein is intended to be broadly construed, and may encompass multiple distinct instances of a commercially-available storage array. For example, the storage array 105 may comprise one or more storage arrays such as one or more Unity™ or PowerMax™ storage arrays, commercially available from Dell Technologies.

Other types of storage products that can be used in implementing a given storage system in illustrative embodiments include software-defined storage, cloud storage, object-based storage and scale-out storage. Combinations of multiple ones of these and other storage types can also be used in implementing a given storage system in an illustrative embodiment.

In some embodiments, a storage system comprises first and second storage arrays arranged in an active-active configuration. For example, such an arrangement can be used to ensure that data stored in one of the storage arrays is replicated to the other one of the storage arrays utilizing a synchronous replication process. Such data replication across the multiple storage arrays can be used to facilitate failure recovery in the system 100. One of the storage arrays may therefore operate as a production storage array relative to the other storage array which operates as a backup or recovery storage array.

It is to be appreciated, however, that embodiments disclosed herein are not limited to active-active configurations or any other particular storage system arrangements. Accordingly, illustrative embodiments herein can be configured using a wide variety of other arrangements, including, by way of example, active-passive arrangements, active-active arrangements, ALUA/ANA arrangements and/or DALUA/DANA arrangements, where ALUA/ANA denotes Asymmetric Logical Unit Access (ALUA) and/or Asymmetric Namespace Access (ANA), and dynamic implementations of ALUA and ANA are referred to herein as DALUA and DANA, respectively. ALUA is typically used for SCSI-based storage while ANA is used for NVMe-based storage.

These and other storage systems can be part of what is more generally referred to herein as a processing platform comprising one or more processing devices each comprising a processor coupled to a memory. A given such processing device may correspond to one or more virtual machines or other types of virtualization infrastructure such as Docker containers or other types of LXCs. As indicated above, communications between such elements of system 100 may take place over one or more networks.

The term "processing platform" as used herein is intended to be broadly construed so as to encompass, by way of illustration and without limitation, multiple sets of processing devices and one or more associated storage systems that are configured to communicate over one or more networks. For example, distributed implementations of the host devices 102 are possible, in which certain ones of the host devices 102 reside in one data center in a first geographic location while other ones of the host devices 102 reside in one or more other data centers in one or more other geographic locations that are potentially remote from the first geographic location. Thus, it is possible in some implementations of the system 100 for different ones of the host devices 102 to reside in different data centers than the storage array 105.

Numerous other distributed implementations of the host devices 102 and/or the storage array 105 are possible. Accordingly, the storage array 105 can also be implemented in a distributed manner across multiple data centers.

It is to be appreciated that these and other features of illustrative embodiments are presented by way of example only, and should not be construed as limiting in any way. Accordingly, different numbers, types and arrangements of system components such as host devices 102, SAN 104, storage array 105, storage devices 106, sets of IO queues 110, and MPIO drivers 112, including their corresponding instances of path selection logic 114 and notification processing logic 115, can be used in other embodiments.

It should also be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

The operation of the information processing system 100 will now be described in further detail with reference to the flow diagram of the illustrative embodiment of FIG. 2. The process as shown includes steps 200 through 206, and is suitable for use in the system 100 but is more generally applicable to other types of systems comprising at least one host device and a storage system. The storage system in this embodiment is assumed to comprise at least one storage array having a plurality of storage devices. The storage devices can include logical storage devices such as LUNs or other logical storage volumes.

Figure 2:
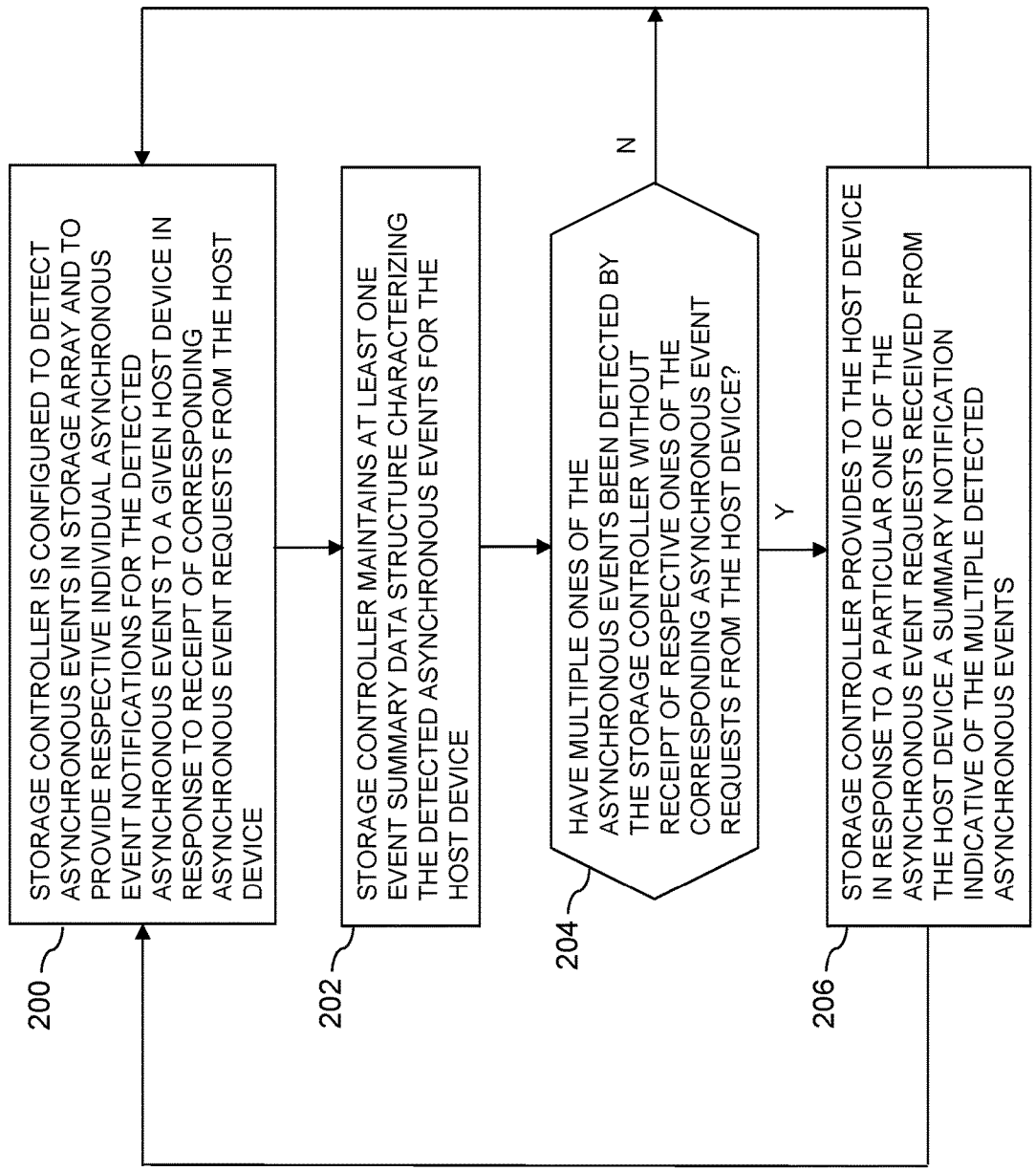
FIG. 2 is a flow diagram of an example process for concurrent handling of multiple asynchronous events in a storage system for notification to one or more host devices in an illustrative embodiment.

The steps of the FIG. 2 process are illustratively performed by one or more storage controllers of a storage array, cooperatively interacting with a multi-path layer comprising one or more MPIO drivers of respective host devices, possibly with some participation by one or more additional or alternative components such as an external server comprising an MPIO management station. Other arrangements of additional or alternative system components can be configured to perform at least portions of one or more of the steps of the FIG. 2 process in other embodiments.

The steps shown in FIG. 2 more specifically relate to processing performed by a storage controller of a storage array interacting with a given host device. It is assumed that similar processes are implemented for each of a plurality of additional hosts that interact with the storage array. An MPIO management station is not required in this embodiment and other illustrative embodiments disclosed herein.

In step 200, a storage controller is configured to detect asynchronous events in a storage array and to provide respective individual asynchronous event notifications for the detected asynchronous events to a given host device in response to receipt of corresponding asynchronous event requests from the host device. For example, the storage controller is illustratively one of the storage controllers 120 of the storage array 105, and the given host device is illustratively one of the host devices 102 that communicate with the storage array 105 in the system 100. The asynchronous event notifications and asynchronous event requests are illustratively configured in accordance with a particular storage access protocol, such as an NVMe access protocol. The asynchronous event notifications and asynchronous event requests are also referred to herein as AENs and AERs, respectively.

The asynchronous events illustratively comprise asynchronous events of different types, such as, for example, two or more of an error status event, a health status event, a notice event and a vendor specific event. At least one of the different event types can itself comprise a plurality of sub-types.

The storage array in some embodiments is assumed to be configured such that, after reporting a first individual asynchronous event notification for a first one of the detected asynchronous events of a given event type, the storage array delays the subsequent reporting of another individual asynchronous event notification for another one of the detected asynchronous events of the given event type until at least such time as the host device clears the reported first individual asynchronous event notification by reading a corresponding log page from the storage array. In the context of an NVMe protocol, this is referred to as "masking" of additional asynchronous events of the given event type, until the host device has cleared a previously-reported asynchronous event of that same type.

In step 202, the storage controller maintains at least one event summary data structure characterizing the detected asynchronous events for the host device. The event summary data structure illustratively comprises one of the event summary data structures 122 of the storage array 105 in FIG. 1. An example configuration for such an event summary data structure will be described in more detail below in conjunction with FIG. 4.

In step 204, a determination is made as to whether or not the storage controller has detected multiple ones of the asynchronous events without receipt of respective ones of the corresponding asynchronous event requests from the host device. If the determination is affirmative, the process moves to step 206, and otherwise returns to step 200 as indicated.

In step 206, the storage controller provides to the host device in response to a particular one of the asynchronous event requests received from the host device a summary notification indicative of the multiple detected asynchronous events. The process then returns to step 200 as indicated.

The summary notification in some embodiments more particularly comprises at least a summary log page identifier that is utilized by the host device to read a corresponding summary log page from the storage system. The summary notification illustratively denotes a summary event comprising the multiple detected asynchronous events.

The summary log page illustratively contains information characterizing detected asynchronous events that are at least one of (i) not yet reported by the storage system to the host device and (ii) reported by the storage system to the host device but not yet cleared by the host device.

In some embodiments, the summary log page comprises information characterizing multiple detected asynchronous events having a same event type but respective different sub-types within that event type.

Additionally or alternatively, the summary log page in some embodiments comprises information characterizing multiple detected asynchronous events of respective different event types.

Although not shown in the FIG. 2 process, the storage controller is illustratively further configured to receive from the host device a request for the summary log page and to provide the summary log page to the host device in response to the request.

The particular one of the asynchronous event requests received from the host device and triggering provision of the summary notification by the storage controller in step 206 illustratively comprises a next one of the asynchronous event requests received after an affirmative determination in step 204 that multiple ones of the asynchronous events have been detected in the storage array without receipt of respective ones of the corresponding asynchronous event requests from the host device.

The particular processing operations and other system functionality described in conjunction with the flow diagram of FIG. 2 are presented by way of illustrative example only, and should not be construed as limiting the scope of the disclosure in any way. Alternative embodiments can use other types of processing operations involving host devices, storage systems and functionality for concurrent handling of multiple asynchronous events. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different arrangements for concurrent handling of multiple asynchronous events for a plurality of host devices within a given information processing system.

Functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Figure 3:
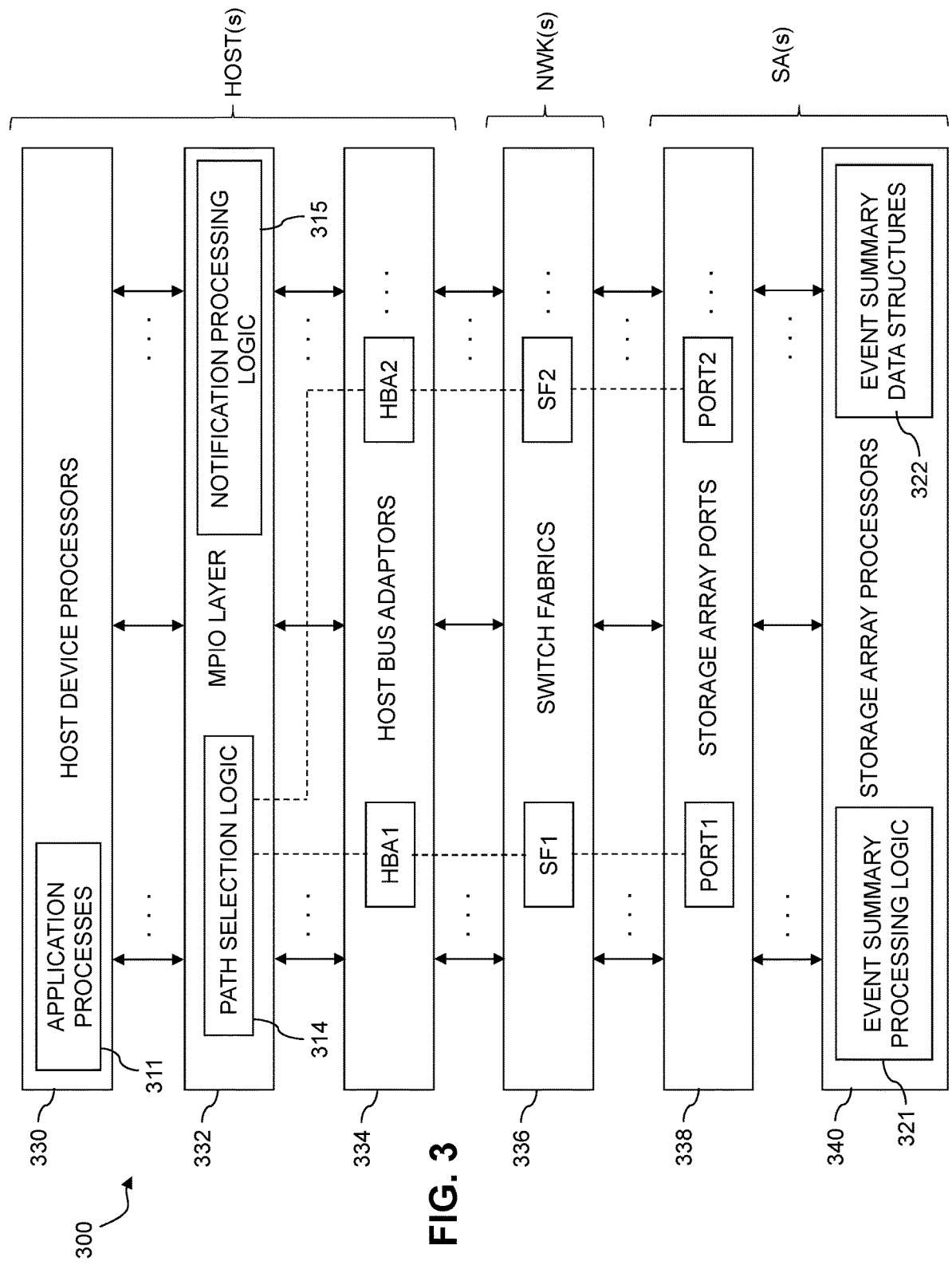
FIG. 3 is a block diagram showing multiple layers of a layered system architecture that incorporates functionality for concurrent handling of multiple asynchronous events in a storage system for notification to one or more host devices in an illustrative embodiment.

Referring now to FIG. 3, another illustrative embodiment is shown. In this embodiment, an information processing system 300 comprises host-side elements that include application processes 311, path selection logic 314 and notification processing logic 315, and storage-side elements that include event summary processing logic 321 and event summary data structures 322 for storing event types, sub-types, log page identifiers and other related information utilized in concurrent handling of multiple asynchronous events. There may be separate instances of one or more such elements associated with each of a plurality of storage arrays of the system 300.

The system 300 is configured in accordance with a layered system architecture that illustratively includes a host device processor layer 330, an MPIO layer 332, an HBA layer 334, a switch fabric layer 336, a storage array port layer 338 and a storage array processor layer 340. The host device processor layer 330, the MPIO layer 332 and the HBA layer 334 are associated with one or more host devices, the switch fabric layer 336 is associated with one or more SANs or other types of networks, and the storage array port layer 338 and storage array processor layer 340 are associated with one or more storage arrays ("SAs"). The storage array processors of the storage array processor layer 340 may be viewed as corresponding to one or more storage controllers such as the storage controllers 120 of the storage array 105.

The application processes 311 of the host device processor layer 330 generate IO operations that are processed by the MPIO layer 332 for delivery to the one or more storage arrays over the SAN comprising switch fabrics of switch fabric layer 336. Paths are determined by the path selection logic 314 for sending such IO operations to the one or more storage arrays. The IO operations are sent by the MPIO layer 332 to a storage array over respective paths selected using one or more algorithms implemented by path selection logic 314.

The MPIO layer 332 is an example of what is also referred to herein as a multi-path layer, and comprises one or more MPIO drivers implemented in respective host devices. Each such MPIO driver illustratively comprises respective instances of path selection logic 314 and notification processing logic 315 configured as previously described. Additional or alternative layers and logic arrangements can be used in other embodiments.

In a manner similar to that described elsewhere herein, the MPIO layer 332 comprising notification processing logic 315 illustratively processes asynchronous event notifications received from one or more storage arrays. For example, the notification processing logic 315 can receive a summary notification from a storage array, with the summary notification being indicative of multiple detected events. The notification processing logic 315 can respond to such a summary notification by requesting a summary log page from the storage array and/or taking other related actions.

In the system 300, path selection logic 314 is configured to select different paths for sending IO operations from a given host device to a storage array. These paths as illustrated in the figure include a first path from a particular HBA denoted HBA1 through a particular switch fabric denoted SF1 to a particular storage array port denoted PORT1, and a second path from another particular HBA denoted HBA2 through another particular switch fabric denoted SF2 to another particular storage array port denoted PORT2.

These two particular paths are shown by way of illustrative example only, and in many practical implementations there will typically be a much larger number of paths between the one or more host devices and the one or more storage arrays, depending upon the specific system configuration and its deployed numbers of HBAs, switch fabrics and storage array ports. For example, each host device in the FIG. 3 embodiment can illustratively have a set of k paths to a shared storage array, or alternatively different ones of the host devices can have different numbers and types of paths to the storage array.

The path selection logic 314 of the MPIO layer 332 in this embodiment selects paths for delivery of IO operations to the one or more storage arrays having the storage array ports of the storage array port layer 338. More particularly, the path selection logic 314 determines appropriate paths over which to send particular IO operations to particular logical storage devices of the one or more storage arrays.

Some implementations of the system 300 can include a relatively large number of host devices (e.g., 1000 or more host devices), although as indicated previously different numbers of host devices, and possibly only a single host device, may be present in other embodiments. Each of the host devices is typically allocated with a sufficient number of HBAs to accommodate predicted performance needs. In some cases, the number of HBAs per host device is on the order of 4, 8 or 16 HBAs, although other numbers of HBAs could be allocated to each host device depending upon the predicted performance needs. A typical storage array may include on the order of 128 ports, although again other numbers can be used based on the particular needs of the implementation. The number of host devices per storage array port in some cases can be on the order of 10 host devices per port. The HBAs of the host devices are assumed to be zoned and masked to the storage array ports in accordance with the predicted performance needs, including user load predictions.

A given host device of system 300 can be configured to initiate an automated path discovery process to discover new paths responsive to updated zoning and masking or other types of storage system reconfigurations performed by a storage administrator or other user. For certain types of host devices, such as host devices using particular operating systems such as Windows, ESX or Linux, automated path discovery via the MPIO drivers of a multi-path layer is typically supported. Other types of host devices using other operating systems such as AIX in some implementations do not necessarily support such automated path discovery, in which case alternative techniques can be used to discover paths.

In an example process for concurrent handling of multiple asynchronous events in the system 300, one or more storage array processors of the storage array processor layer 340 are configured to detect a plurality of asynchronous events in one or more of the storage arrays. A given such storage array is illustratively configured to provide respective individual asynchronous event notifications for the detected asynchronous events to a host device in response to receipt of corresponding asynchronous event requests from the host device. The one or more storage array processors determine that multiple ones of the asynchronous events have been detected in the storage array without receipt of respective ones of the corresponding asynchronous event requests from the host device, and provide to the host device in response to a particular one of the asynchronous event requests received from the host device a summary notification comprising information indicative of the multiple detected asynchronous events. The asynchronous event requests and the corresponding asynchronous event notifications are configured in accordance with a designated storage access protocol, illustratively an NVMe access protocol, although other storage access protocols can be used. The asynchronous events illustratively comprise asynchronous events of different types, including two or more of an error status event, a health status event, a notice event and a vendor specific event, and wherein at least one of the event types comprises a plurality of sub-types.

The summary notification illustratively comprises at least a summary log page identifier that is utilized by the host device to read a corresponding summary log page from the storage array. For example, the summary log page illustratively contains information characterizing detected asynchronous events that are at least one of (i) not yet reported by the storage array to the host device and (ii) reported by the storage array to the host device but not yet cleared by the host device.

The storage array illustratively receives from the host device a request for the summary log page and provides the summary log page to the host device in response to the request. These and other operations are illustratively implemented at least in part through cooperative interaction of notification processing logic 315 and event summary processing logic 321 utilizing event summary data structures 322.

Referring now to FIG. 4, an example event summary data structure 400 utilized in concurrent handling of multiple asynchronous events as disclosed herein is shown. The event summary data structure 400 may be viewed as an example of a given one of the event summary data structures 122 in the FIG. 1 embodiment or a given one of the event summary data structures 322 in the FIG. 3 embodiment. Such event summary data structures are illustratively maintained in accordance with instances of event summary processing logic 121 or event summary processing logic 321 by storage controllers 120 in storage array 105 of system 100 or storage array processors of storage array processor layer 340 in system 300.

In the example event summary data structure 400, a storage array stores information characterizing multiple asynchronous events detected within the storage array. The events are illustratively stored in the event summary data structure 400 as the events are detected within the storage array. Individual events are reported by the storage array to the host device in response to receipt of corresponding asynchronous event requests from the host device, and such reported individual events are cleared from the event summary data structure when a log page for the corresponding event is read by a host device. As indicated previously, the storage array is illustratively configured such that, after reporting a first individual asynchronous event notification for a first one of the detected asynchronous events of a given event type, the storage array delays reporting another individual asynchronous event notification for another one of the detected asynchronous events of the given event type until at least such time as the host device clears the reported first individual asynchronous event notification by reading a corresponding log page from the storage system.

The example event summary data structure 400 more particularly comprises a plurality of entries for respective events detected in the storage array for reporting to at least a given host device denoted as host device i, which illustratively denotes one of the host devices 102 of the system 100. Different instances of the event summary data structure 400 may be maintained for different ones of the host devices 102. The event entries are illustratively denoted Event 1, Event 2, . . . Event P, and for each such entry, the event summary data structure 400 further stores an event type and a log page identifier (ID), and possibly other information such as an event sub-type if the particular event type has multiple sub-types. The variable P illustratively denotes a total number of detected events that have not yet been cleared by the host device, including at least one or more unreported events as well as one or more reported but uncleared events. These detected events can include, for example, multiple detected asynchronous events having a same event type but respective different sub-types within that event type, and/or multiple detected asynchronous events of respective different event types. Other arrangements of detected events and associated information characterizing those detected events can be stored in the event summary data structure 400 in other embodiments.

The storage array utilizes the event summary data structure 400 in generating a summary log page that it illustratively provides to the host device responsive to a request for that summary log page. The storage array first sends a summary notification as described elsewhere herein to make the host device aware of the availability of the summary log page. The summary log page illustratively characterizes multiple detected events, including events that have been detected and not yet reported, and/or events that have been detected and reported but not yet cleared by the host device.

The particular data structure arrangement shown in FIG. 4 is only an example, and numerous other types and arrangements of data structures can be utilized in other embodiments for event types and related information characterizing multiple events to be notified to at least one host device. Such information is considered to fall within the broad scope of "event summary" as that term is used herein.

The above-described processes, algorithms and other features and functionality disclosed herein are presented by way of illustrative example only, and other embodiments can utilize additional or alternative arrangements.

Also, as mentioned previously, different instances of the above-described processes, algorithms and other techniques for concurrent handling of multiple asynchronous events can be performed using different system components.

For example, various aspects of functionality for concurrent handling of multiple asynchronous events in some embodiments can be implemented at least in part using one or more servers that are external to a storage array 105 or other type of storage system. Also, processing logic can be implemented using other types of host drivers, such as, for example, iSCSI drivers, or more generally other host device components.

The particular arrangements described above for concurrent handling of multiple asynchronous events are therefore presented by way of illustrative example only. Numerous alternative arrangements of these and other features can be used in implementing the concurrent handling of multiple asynchronous events in other illustrative embodiments.

As indicated previously, the illustrative embodiments disclosed herein can provide a number of significant advantages relative to conventional arrangements.

For example, some embodiments are advantageously configured to provide asynchronous event summaries from a storage array or other storage system to one or more host devices in order to facilitate concurrent handling of multiple asynchronous events detected in the storage system, where all such detected events might otherwise not be immediately reportable using a standard storage access protocol.

Such arrangements provide a highly efficient solution to asynchronous event reporting limitations of existing storage access protocols, such as an NVMe access protocol.

For example, some embodiments eliminate otherwise problematic situations that can arise based on serialization of AENs due to limitations on outstanding AERs, as well as masking of sub-types of one or more event types.

Various aspects of functionality associated with concurrent handling of multiple asynchronous events as disclosed herein can be implemented in a host device, in a storage system, or partially in a host device and partially in a storage system, and additionally or alternatively using other arrangements of one or more processing devices each comprising at least a processor and a memory coupled to the processor.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

It was noted above that portions of an information processing system as disclosed herein may be implemented using one or more processing platforms. Illustrative embodiments of such platforms will now be described in greater detail. These and other processing platforms may be used to implement at least portions of other information processing systems in other embodiments. A given such processing platform comprises at least one processing device comprising a processor coupled to a memory.

One illustrative embodiment of a processing platform that may be used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as virtual machines, or portions thereof, are illustratively implemented for use by tenants of such a multi-tenant environment.

Cloud infrastructure as disclosed herein can include cloud-based systems implemented at least in part using virtualization infrastructure such as virtual machines and associated hypervisors. For example, virtual machines provided in such systems can be used to implement a fast tier or other front-end tier of a multi-tier storage system in illustrative embodiments. A capacity tier or other back-end tier of such a multi-tier storage system can be implemented using one or more object stores.

In some embodiments, the cloud infrastructure additionally or alternatively comprises a plurality of containers illustratively implemented using respective operating system kernel control groups of one or more container host devices. For example, a given container of cloud infrastructure illustratively comprises a Docker container or other type of LXC implemented using a kernel control group. The containers may run on virtual machines in a multi-tenant environment, although other arrangements are possible. The containers may be utilized to implement a variety of different types of functionality within the system 100. For example, containers can be used to implement respective compute nodes or storage nodes of a cloud-based system. Again, containers may be used in combination with other virtualization infrastructure such as virtual machines implemented using a hypervisor.

Another illustrative embodiment of a processing platform that may be used to implement at least a portion of an information processing system comprises a plurality of processing devices which communicate with one another over at least one network. The network may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

Each processing device of the processing platform comprises a processor coupled to a memory. The processor may comprise a microprocessor, a microcontroller, an application-specific integrated circuit (ASIC), a field-programmable gate array (FPGA), a graphics processing unit (GPU) or other type of processing circuitry, as well as portions or combinations of such circuitry elements. The memory may comprise random access memory (RAM), read-only memory (ROM), flash memory or other types of memory, in any combination. The memory and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals.

Also included in the processing device is network interface circuitry, which is used to interface the processing device with the network and other system components, and may comprise conventional transceivers.

As another example, portions of a given processing platform in some embodiments can comprise hyper-converged infrastructure (HCI).

Again, these particular processing platforms are presented by way of example only, and other embodiments may include additional or alternative processing platforms, as well as numerous distinct processing platforms in any combination, with each such platform comprising one or more computers, servers, storage devices or other processing devices.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in an information processing system as disclosed herein. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality of host devices 102, SAN 104 and storage array 105 are illustratively implemented in the form of software running on one or more processing devices. As a more particular example, the instances of path selection logic 114, notification processing logic 115 and event summary processing logic 121 may be implemented at least in part in software, as indicated previously herein.

It should again be emphasized that the above-described embodiments are presented for purposes of illustration only. Many variations and other alternative embodiments may be used. For example, the disclosed techniques are applicable to a wide variety of other types of information processing systems, utilizing other arrangements of host devices, networks, storage systems, storage arrays, storage devices, processors, memories, notification processing logic, event summary processing logic, event summary data structures, and additional or alternative components. Also, the particular configurations of system and device elements and associated processing operations illustratively shown in the drawings can be varied in other embodiments. For example, a wide variety of different host device and storage system configurations and associated arrangements for processing asynchronous event summaries can be used in other embodiments. Moreover, the various assumptions made above in the course of describing the illustrative embodiments should also be viewed as exemplary rather than as requirements or limitations. Numerous other alternative embodiments within the scope of the appended claims will be readily apparent to those skilled in the art.

What is claimed is:

1. An apparatus comprising:
   at least one processing device comprising a processor coupled to a memory;
   the at least one processing device being configured:
   to detect a plurality of asynchronous events in a storage system, wherein the storage system is configured to provide respective individual asynchronous event notifications for the detected asynchronous events to a host device in response to receipt of corresponding asynchronous event requests from the host device;
   to determine that multiple ones of the detected asynchronous events have been detected in the storage system without receipt of respective ones of the corresponding asynchronous event requests from the host device; and
   to provide to the host device in response to a particular one of the asynchronous event requests received from the host device a summary notification comprising information indicative of the multiple ones of the detected asynchronous events;
wherein the detected asynchronous events have respective individual event type indicators associated therewith and the summary notification has a summary event type indicator associated therewith that is different than any of the individual event type indicators of the detected asynchronous events; and
wherein each of the individual and summary event type indicators corresponds to a different log page retrievable by the host device from the storage system.

2. The apparatus of claim 1 wherein the at least one processing device comprises one or more storage controllers of the storage system, the one or more storage controllers being configured to control performance of the detecting, determining and providing in the storage system.

3. The apparatus of claim 1 wherein the asynchronous event requests and the corresponding asynchronous event notifications are configured in accordance with a designated storage access protocol.

4. The apparatus of claim 3 wherein the designated storage access protocol comprises a Non-Volatile Memory Express (NVMe) access protocol.

5. The apparatus of claim 1 wherein the plurality of asynchronous events comprise asynchronous events of different types, including two or more of an error status event, a health status event, a notice event and a vendor specific event, and wherein at least one of the event types comprises a plurality of sub-types.

6. The apparatus of claim 1 wherein the storage system after reporting a first individual asynchronous event notification for a first one of the detected asynchronous events of a given event type is further configured to delay reporting another individual asynchronous event notification for another one of the detected asynchronous events of the given event type until at least such time as the host device clears the reported first individual asynchronous event notification by reading a corresponding log page from the storage system.

7. The apparatus of claim 1 wherein the summary notification comprises at least a summary log page identifier that is utilized by the host device to read a corresponding summary log page from the storage system.

8. The apparatus of claim 7 wherein the summary log page contains information characterizing detected asynchronous events that are at least one of (i) not yet reported by the storage system to the host device and (ii) reported by the storage system to the host device but not yet cleared by the host device.

9. The apparatus of claim 7 wherein the summary log page comprises information characterizing two or more of the detected asynchronous events having a same event type but respective different sub-types within that event type.

10. The apparatus of claim 7 wherein the summary log page comprises information characterizing two or more of the detected asynchronous events of respective different event types.

11. The apparatus of claim 7 wherein the at least one processing device is further configured to receive from the host device a request for the summary log page and to provide the summary log page to the host device in response to the request.

12. The apparatus of claim 1 wherein the summary notification denotes a summary event comprising the multiple ones of the detected asynchronous events.

13. The apparatus of claim 1 wherein the particular one of the asynchronous event requests received from the host device and triggering provision of the summary notification comprises a next one of the asynchronous event requests received after the determination that the multiple ones of the asynchronous events have been detected in the storage system without receipt of respective ones of the corresponding asynchronous event requests from the host device.

14. The apparatus of claim 1 wherein the at least one processing device is further configured to maintain at least one data structure characterizing at least unreported ones of the detected asynchronous events, and to generate the summary notification based at least in part on the unreported ones of the detected asynchronous events characterized by the at least one data structure.

15. A computer program product comprising a non-transitory processor-readable storage medium having stored therein program code of one or more software programs, wherein the program code, when executed by at least one processing device comprising a processor coupled to a memory, causes the at least one processing device:
to detect a plurality of asynchronous events in a storage system, wherein the storage system is configured to provide respective individual asynchronous event notifications for the detected asynchronous events to a host device in response to receipt of corresponding asynchronous event requests from the host device;
to determine that multiple ones of the asynchronous events have been detected in the storage system without receipt of respective ones of the corresponding asynchronous event requests from the host device; and
to provide to the host device in response to a particular one of the asynchronous event requests received from the host device a summary notification comprising information indicative of the multiple ones of the detected asynchronous events;
wherein the detected asynchronous events have respective individual event type indicators associated therewith and the summary notification has a summary event type indicator associated therewith that is different than any of the individual event type indicators of the detected asynchronous events; and
wherein each of the individual and summary event type indicators corresponds to a different log page retrievable by the host device from the storage system.

16. The computer program product of claim 15 wherein the summary notification comprises at least a summary log page identifier that is utilized by the host device to read a corresponding summary log page from the storage system.

17. The computer program product of claim 16 wherein the summary log page contains information characterizing detected asynchronous events that are at least one of (i) not yet reported by the storage system to the host device and (ii) reported by the storage system to the host device but not yet cleared by the host device.

18. A method comprising:
detecting a plurality of asynchronous events in a storage system, wherein the storage system is configured to provide respective individual asynchronous event notifications for the detected asynchronous events to a host device in response to receipt of corresponding asynchronous event requests from the host device;
determining that multiple ones of the asynchronous events have been detected in the storage system without receipt of respective ones of the corresponding asynchronous event requests from the host device; and providing to the host device in response to a particular one of the asynchronous event requests received from the host device a summary notification comprising information indicative of the multiple ones of the detected asynchronous events;

wherein the detected asynchronous events have respective individual event type indicators associated therewith and the summary notification has a summary event type indicator associated therewith that is different than any of the individual event type indicators of the detected asynchronous events; and wherein each of the individual and summary event type indicators corresponds to a different log page retrievable by the host device from the storage system.

19. The method of claim 18 wherein the summary notification comprises at least a summary log page identifier that is utilized by the host device to read a corresponding summary log page from the storage system.

20. The method of claim 19 wherein the summary log page contains information characterizing detected asynchronous events that are at least one of (i) not yet reported by the storage system to the host device and (ii) reported by the storage system to the host device but not yet cleared by the host device.

* * * * *